Dec. 5, 1967     EIJI FURUKAWA     3,356,038
APPARATUS FOR THE SIDEWISE DISPLACEMENT
OF WHEELED VEHICLES
Filed Dec. 13, 1965
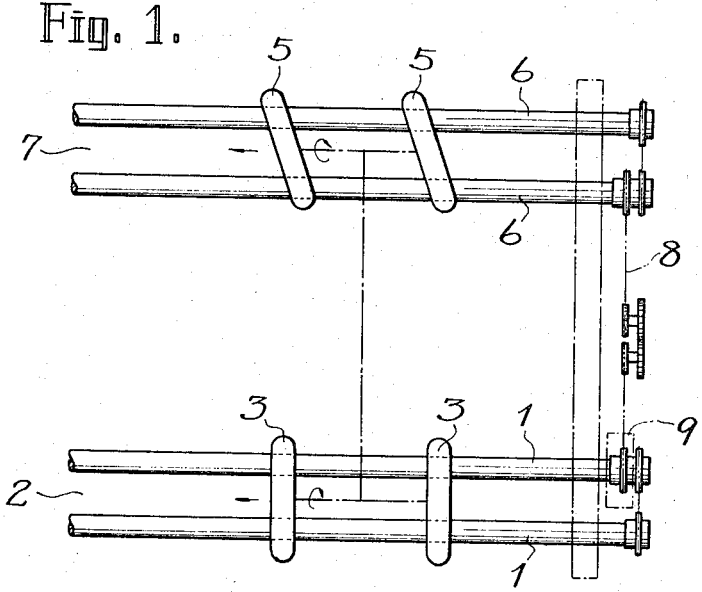
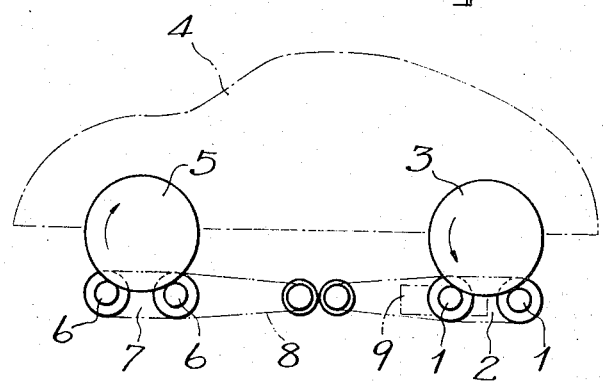
INVENTOR.
EIJI FURUKAWA
BY
Linton and Linton
ATTORNEYS

United States Patent Office 3,356,038
Patented Dec. 5, 1967

3,356,038
APPARATUS FOR THE SIDEWISE DISPLACEMENT OF WHEELED VEHICLES
Eiji Furukawa, Chiba-shi, Japan, assignor to Daido Yusoki Kabushiki, Kaisha, Toyko, and Hitachi Zosen Kabushiki Kaisha, Osaka, Japan, both corporations of Japan
Filed Dec. 13, 1965, Ser. No. 513,293
Claims priority, application Japan, Dec. 17, 1964, 39/71,521
2 Claims. (Cl. 104—35)

The present invention is concerned with a device for laterally displacing an automobile or the like and has as an object the provision of means for parking many automobiles within a relatively limited area.

In describing this invention, I will make frequent use of the expression "car." It is to be understood that this term represents such cars as have at least three wheels, of which at least one wheel is the aximuthal wheel for steering the car, and which wheels are divided into two groups, namely front wheels and rear wheels.

Briefly stated in accordance with one aspect of this invention, there is provided a device for displacing an automobile or the like of the class described by the term "car," comprising at least two sets of at least two rotatable rollers each arranged in parallel with one another with one roller of one of said two sets being connected with one roller of the other of said two sets by a transmission means so as to be rotatably unidirectionally at the same time. Upon placing said car on said rollers in such a manner that the wheels belonging to one of the two groups of wheels is placed on two rollers of a set and all the wheels belonging to the other of the two groups is placed on two rollers of the other set, rotating the rollers, and steering the car, the car will be laterally displaced.

By rotating the rollers as above, the car is displaced in the steering direction. When the car is an ordinary automobile, the two rear wheels may be placed on the two rollers of a set, and at the same time, the two front wheels may be placed on the two rollers of the other set, when the interval between the two sets is adapted to the wheel base of the predetermined car. Therefore, it is possible to drive the four rollers by the driving wheels of the car. It is, however, also possible to drive the rollers by another means such as an electric motor.

A further object of the invention is to provide means for supporting and shifting a car laterally in the direction of at least one steering wheel of the car for parking purposes.

The invention will be better understood and other objects and additional advantages of the invention will become apparent upon perusal of the following description taken in connection with the drawings, in which:

FIG. 1 is a partial plan view of a device according to the invention with automobile wheels mounted thereon; and FIG. 2 is an elevational view thereof.

Referring more particularly to the drawings, the preferred embodiment of this invention will now be described. However, this description will be understood to be illustrative of the invention and not as limiting it to the particular provision shown and described. There are arranged four rollers 1 and 6 arranged parallel to another. Two rollers 1 of the four form a set and the other two rollers 6 form another set. Two rollers 1 are arranged at an interval of a space 2 chosen to allow the rear wheel 3 of the car to be placed thereon. Two rollers 6 are arranged at an interval of another space 7 chosen to permit the front wheel 5 of the car to be placed thereon. The two spaces 2 and 7 are also chosen so as to be spaced a distance corresponding to the wheel base of the car 4. One of the two rollers 1 and one of the other rollers 6 are connected with each other by a transmission means such as a belt 8 so as to rotate the two rollers 1 and 6 in the same direction. There is provided a braking means 9 for braking the rotation.

In the use of the present device an automobile 4 is driven onto the rollers by its own power slowly and carefully at a right angle to the direction of the axes of the rollers 1 and 6 in such a manner that the front wheels 5 are placed at the space 7 between the two rollers 6 and the rear wheels 3 are placed at the space 2 between the two rollers 1. It is to be seen that the rollers 1 and 6 should be held by the braking means 9 during the driving operation onto the rollers 1 and 6.

Upon release of the brake 9, the rear wheels 3 are driven by the engine of the automobile 4 so that the four rollers 1 and 6 are rotated in the same direction together with the front wheels 5 of the automobile 4 but the automobile 4 it self is never advanced. Under these circumstances, if the steering gear of the automobile 4 is operated, the automobile 4 is not advanced in any direction but shifted laterally in the direction of the steering wheel along the axes of the rollers 1 and 6, being carried by the rollers 1 and 6 as it is. When the automobile 4 is steered as for a left turn as shown in FIG. 1, the front wheels 5 continuing an apparent lost motion are driven by the rollers 6 leftwards of FIG. 1. By virtue of the tendency to be displaced leftwards of the front wheels 5, the rear wheels 3 are also displaced leftwards because the rear wheels 3 are continuing rotation on the rollers 1, so that the automobile 4 is displaced leftwards.

It is possible to drive the rollers 1 and 6 by other means, for example either of the rollers 1 and 6 connected by the belt 8 with each other may be driven by a suitable means, for example, an electric motor (not shown). Of course, in such a case, it is not necessary to drive the rollers 1 by the driving wheel 3 of the automobile 4.

While a particular embodiment of the invention has been illustrated and described, modifications thereof will readily occur to those skilled in the art. It should be understood therefore that the invention is not limited to the particular provision and procedure disclosed but that the appended claims are intended to cover all modifications which do not depart from the true spirit and scope of the invention.

What is claimed as new and desired to be secured by Letters Patent of the United States is:

1. Apparatus for moving a vehicle laterally to the longitudinal axis of the vehicle comprising a vehicle having at least a steering wheel at one end and a driving wheel at its other end, supporting means, a plurality of sets of rollers rotatably mounted on said supporting means for rotating about fixed axes with respect to said supporting means, said roller axis of rotation being parallel to one another, and said sets of rollers spaced apart a distance corresponding to the wheel base of the vehicle and having said steering wheel directly mounted on at least one set of said rollers with the plane of said wheel disposed angularly to said roller axes and said car driving wheel being directly mounted on at least a second set of said rollers with the longitudinal axis of the vehicle extending laterally of the axes of rotation of said rollers and means operatively connecting said rollers for being driven together by said car driving wheel whereby said car will be laterally displaced by and in the direction of rolling of said steering wheel.

2. Apparatus for moving a vehicle laterally to the longitudinal axis of the vehicle comprising a vehicle having at least a steering wheel at one end and a driving wheel at its other end, supporting means, a first pair of rollers and a second pair of rollers mounted on said supporting means for rotating about fixed axes with respect to said supporting means, said roller axes being parallel to one another, said first pair of rollers being spaced apart a distance for supporting said driving wheel extending thereacross, said second pair of rollers being spaced apart a distance for supporting said steering wheel thereacross with the plane of the steering wheel disposed at an angle to the axis of said last mentioned rollers, said second pair of rollers being spaced from said first pair of rollers a distance corresponding to the wheel base of the vehicle supporting the vehicle with its longitudinal axis extending laterally of the axis of rotation of said rollers, means operatively connecting at least one roller of said first pair of rollers to at least one roller of said second pair of rollers, means for driving said connecting means whereby the vehicle wheels will rotate with said rollers and the turning of said steering wheel will then displace the vehicle on said rollers in the direction of rotation of said steering wheel.

References Cited

UNITED STATES PATENTS

| | | | |
|---|---|---|---|
| 1,373,790 | 4/1921 | Becker | 180—1 |
| 2,180,127 | 11/1939 | Solomon | 214—16.1 |
| 2,597,930 | 5/1952 | Grosvenor | 214—339 X |
| 2,705,570 | 4/1953 | Maissian | 214—16.1 |

FOREIGN PATENTS

| | | |
|---|---|---|
| 203,411 | 3/1959 | Austria. |

A. HARRY LEVY, *Primary Examiner.*